Oct. 2, 1962  L. P. RETZINGER, JR  3,056,956
ANALOG-DIGITAL CONVERTER
Filed Nov. 5, 1954  4 Sheets-Sheet 1

INVENTOR.
LEO P. RETZINGER, JR.
BY
*Theodore H. Lassagne*
ATTORNEY

FIG. 3.

INVENTOR.
LEO P. RETZINGER, JR.
BY
ATTORNEY

United States Patent Office 3,056,956
Patented Oct. 2, 1962

3,056,956
ANALOG-DIGITAL CONVERTER
Leo P. Retzinger, Jr., Reseda, Calif., assignor to General
Precision, Inc., a corporation of Delaware
Filed Nov. 5, 1954, Ser. No. 467,154
28 Claims. (Cl. 340—347)

This invention relates to analogue-to-digital converters and more particularly to converters for sequentially producing a plurality of signals representing a digital quantity in accordance with the positioning of a shaft or other member representing an analogue quantity.

In recent years, vast strides have been made in building different types of computers for solving complex mathematical problems. Many of these computers operate on a digital basis. In digital computers, a plurality of signals are produced to represent a multi-digital number. For example, a decimal value of "91" may be represented by a binary code such as 1011011, where the least significant digit is at the right. By utilizing pluralities of signals to represent different numbers, the digital computer obtains solutions with increased accuracies relative to those which can be obtained by other types of computers such as analogue computers.

Sometimes the digital computers now in use must utilize analogue quantities. For example, in determining the direction in which a gun must point the digital computer must utilize such analogue quantities as the angular rotation of a shaft or shafts. Numerous attempts have been made to produce a satisfactory analogue-to-digital converter but such attempts have not been entirely successful. Some of the converters which have been built have required the use of a plurality of mechanical switches. These switches have made the converters bulky and expensive. Other converters have utilized components which have prevented the converter from being reliable under all circumstances.

This invention provides an analogue-to-digital converter which requires no movable components such as switches. The converter includes a flip-flop or other bistable member which operates on a sequential basis to produce a plurality of signals representing the angular positioning of a shaft or the positioning of any other information member. The converter also includes a plurality of logical networks which are activated on a sequential basis in accordance with the operation of the bistable member. In this way, a converter is obtained which is compact, accurate, reliable and inexpensive.

The converter constituting this invention includes information means such as a disk for providing an analogue representation of an information value in accordance with the movements of the disk. The information means provides pairs of control signals having a digital significance related to one another in a geometric progression. When the information member is a disk, the pairs of control signals may be provided by conductive and non-conductive portions disposed on the disk in rows such that the portions in each row have a length substantially twice as great as the portions in the preceding row.

Pairs of receiving means are provided such that each pair of receiving means is associated with a different pair of control means. When the information member is a disk, the receiving means may be brushes contacting the conductive and non-conductive portions of the disk. The brushes in each pair may be separated from each other by a distance related to the lengths of the conductive and non-conductive portions in the associated row.

Means are included to produce pulses in sequence and to count the number of pulses. Upon each successive count, a different pair of receiving means becomes activated. One of the receiving means in the activated pair then becomes selected in accordance with the signal produced by the selected receiving means in the previously activated pair. The selected receiving means then produces a signal in accordance with its relationship to the associated control signal means. For example, a selected brush may produce a signal in accordance with its disposition contiguous to a conductive or non-conductive portion on an information disk.

Means are included to produce output signals in accordance with the signals produced by the selected receiving means. Such output means may be a bistable member having first and second states of operation. The bistable member becomes triggered to its first and second states of operation in accordance with the selection of a particular receiving means in a pair and in accordance with the relationship between the selected receiving means and the associated control signal means.

In this way, apparatus is provided for converting an analogue quantity into a digital representation without any possibilities of obtaining ambiguity in the digital representation. The conversion is obtained by activating each pair of receiving means in sequence and by controlling the selection of a particular receiving means in each activated pair in accordance with information obtained from the previously activated pair of receiving means. The particular receiving means is selected in each pair on the basis of obtaining unambiguous results from that receiving means.

An object of this invention is to provide a conversion of an analogue quantity such as the angular position of a shaft into a plurality of signals representing a digital quantity. Another object is to sequentially produce a plurality of signals such that the value represented by each signal is progressively greater than the value represented by the previous signal.

A further object is to convert an analogue quantity into a plurality of signals representing a digital quantity without utilizing any movable components such as switches.

Still another object is to provide a converter utilizing a bistable member to produce a plurality of signals and utilizing diode networks to control the operation of the bistable member.

A still further object is to provide a converter which produces a plurality of signals in a minimum amount of time so that an accurate representation of an analogue quantity can be obtained in digital form even while the value of the analogue quantity is changing.

Other objects will be apparent from a detailed description of the invention and from the appended drawings and claims.

In the drawings:

FIGURE 3 is a circuit diagram, partly in block form, showing other stages in the electrical system forming a part of this invention;

Figure 1:
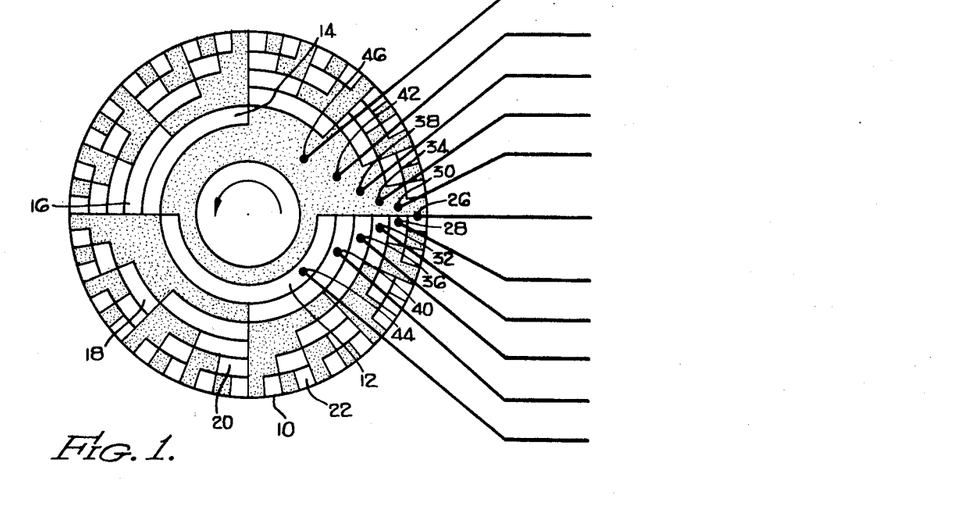
FIGURE 1 is a somewhat schematic diagram illustrating an information member positionable in accordance with the value of an analogue quantity and further illustrating certain members operative with the information member to produce a conversion of the analogue quantity into digital signals.

The apparatus shown in FIGURE 1 includes an information member such as a disc 10 rotatable by a drive member such as a motor (not shown). The disc 10 may be made from a suitable insulating material coated with conductive portions in a particular pattern to produce a plurality of annular rows 12, 14, 16, 18, 20 and 22. The rows 12, 14, 16, 18, 20 and 22 are disposed in contiguous relationship to one another at progressive radial distances from the center of the disc 10.

The row 12 has a conductive portion angularly extending through an arc of substantially 180° and a non-conductive portion extending through the other 180°. The row 14 has two conductive portions and two non-conductive portions alternatively disposed relative to one another and having angular lengths of substantially 90°. The leading edge of one of the non-conductive portions in the row 14 is aligned with the leading edge of the non-conductive portion in the row 12. In the drawings, the conductive portions are represented by the shaded areas and the non-conductive portions are represented by the unshaded areas.

In like manner, the row 16 has four conductive portions and four non-conductive portions each having an angular length of approximately 45°. The conductive and non-conductive portions are alternately disposed relative to one another with the leading edge of one of the non-conductive portions substantially aligned with the leading edge of the non-conductive portion in the row 12. The row 18 has eight conductive and eight non-conductive portions alternately arranged relative to one another. The leading edge of a non-conductive portion in the row 18 is substantially aligned with the leading edge of the non-conductive portion in the row 12. Each of the rows 20 and 22 in turn has numbers of conductive and non-conductive portions which are twice as great as the numbers of conductive and non-conductive portions in the preceding row.

It should be appreciated that other types of information members than the disc 10 can be used. For example, an information member can be used to move on a linear basis rather than an angular basis. Furthermore, the information member may be made from a conductive material having non-conductive portions disposed in the proper positions on it. It should also be appreciated that a plurality of information members can be used in which the various information members are coupled to each other by suitable gear trains so that the movement of each information member is related to the movement of the previous information members.

A plurality of receiving means are associated with the different rows 12, 14, 16, 18, 20 and 22 of conductive and non-conductive portions. These receiving means may be brushes adapted to ride on the face of the disc to produce signals in accordance with their contiguous disposition relative to the conductive and non-conductive portions. For example, a single brush 26 is associated with the row 22 to receive signals from the conductive and non-conductive portions in the row. The brush 26 is disposed at the leading edge of a non-conductive portion in the row 22 when the disc 10 is in its "0" position.

Only one brush in associated with the row 22 but two brushes are associated with each of the other rows. For example, brushes 28 and 30, brushes 32 and 34, brushes 36 and 38, brushes 40 and 42 and brushes 44 and 46 are associated with the rows 20, 18, 16, 14 and 12, respectively. The brushes 28, 32, 36, 40 and 44 contact the disc 10 at positions to one side of the disc 10 and the brushes 30, 34, 38, 42 and 46 contact the disc 10 at positions on the other side of the disc 10 and in symmetrical relationship to the brushes 28, 32, 36, 40 and 44. The brushes 28, 32, 36, 40 and 44 are leading brushes when the disc 10 rotates in a counterclockwise direction.

The brushes 28, 32, 36, 40 and 44 contact the disc 10 at positions removed from the brush 26 by angular distances substantially positions removed from the brush 26 by angular distances substantially equal to ¼ of the lengths of the conductive and non-conductive portions in their associated rows. For example, the brush 28 is separated from the brush 26 by an angular distance of substantially 22.5° and the brush 32 is separated from the brush 26 by an angular distance of substantially 11.25°.

As the disc 10 rotates, the conductive and non-conductive portions in each row become disposed in different relationship to their associated brushes. The angular rotation is indicated in digital form by the disposition of the brushes relative to the conductive and non-conductive portions in their associated rows. Since the conductive and non-conductive portions in the row 22 have a smaller angular length than the conductive and non-conductive portions in any other row, this row indicates a binary digit of least significance. In other words, the row 22 indicates a value of "1" or "0." Similarly, the row 20 indicates a value of "2" or "0" and the row 18 indicates a value of "4" or "0." In like manner, each row in a radially inwardly direction indicates the value of a binary digit substantially twice as great as the value of the digit in the preceding row.

The value of the digit in the row 22 is indicated by the brush 26 since this is the only brush associated with the row. Since each of the other rows has two brushes associated with it, only one of the brushes in the row can provide an indication. The particular brush which is activated in dependent upon the value obtained in the preceding row, as will be disclosed in detail hereinafter. The signal provided by the activated brush then operates to determine which of the two brushes in the next row is activated. In this way, a plurality of signals are sequentially produced representing in digital form an analogue quantity such as a shaft rotation.

Figures 2, 5:
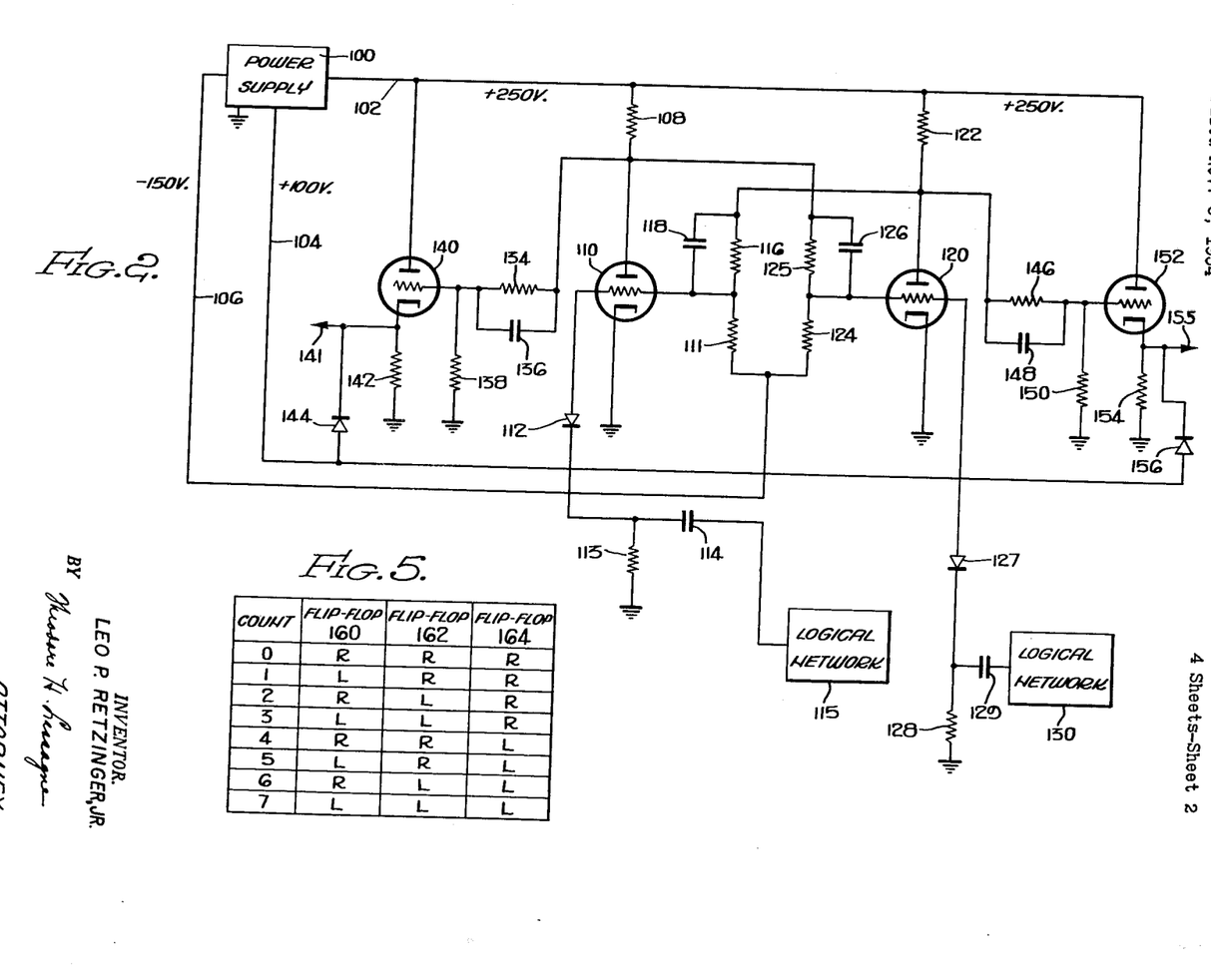
FIGURE 2 is a circuit diagram, partly in block form, showing certain stages in an electrical system for operating in conjunction with the members shown in FIGURE 1 to produce a plurality of signals representing the analogue quantity in digital form.
FIGURE 5 is a chart illustrating the operation of the circuits shown in FIGURE 3.
Figure 4:
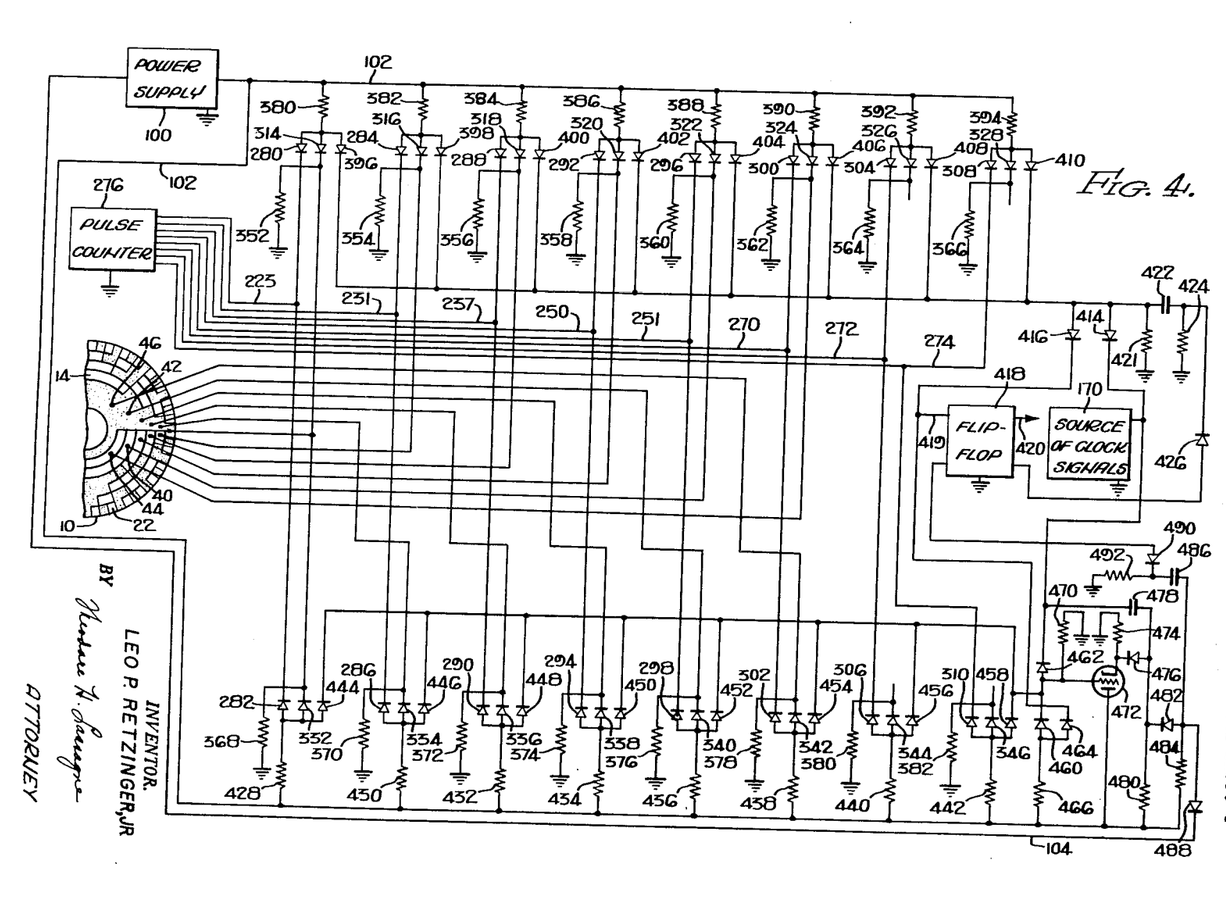
FIGURE 4 is a circuit diagram partly in block form showing still other stages in the electrical system forming a part of this invention.
Figure 5:
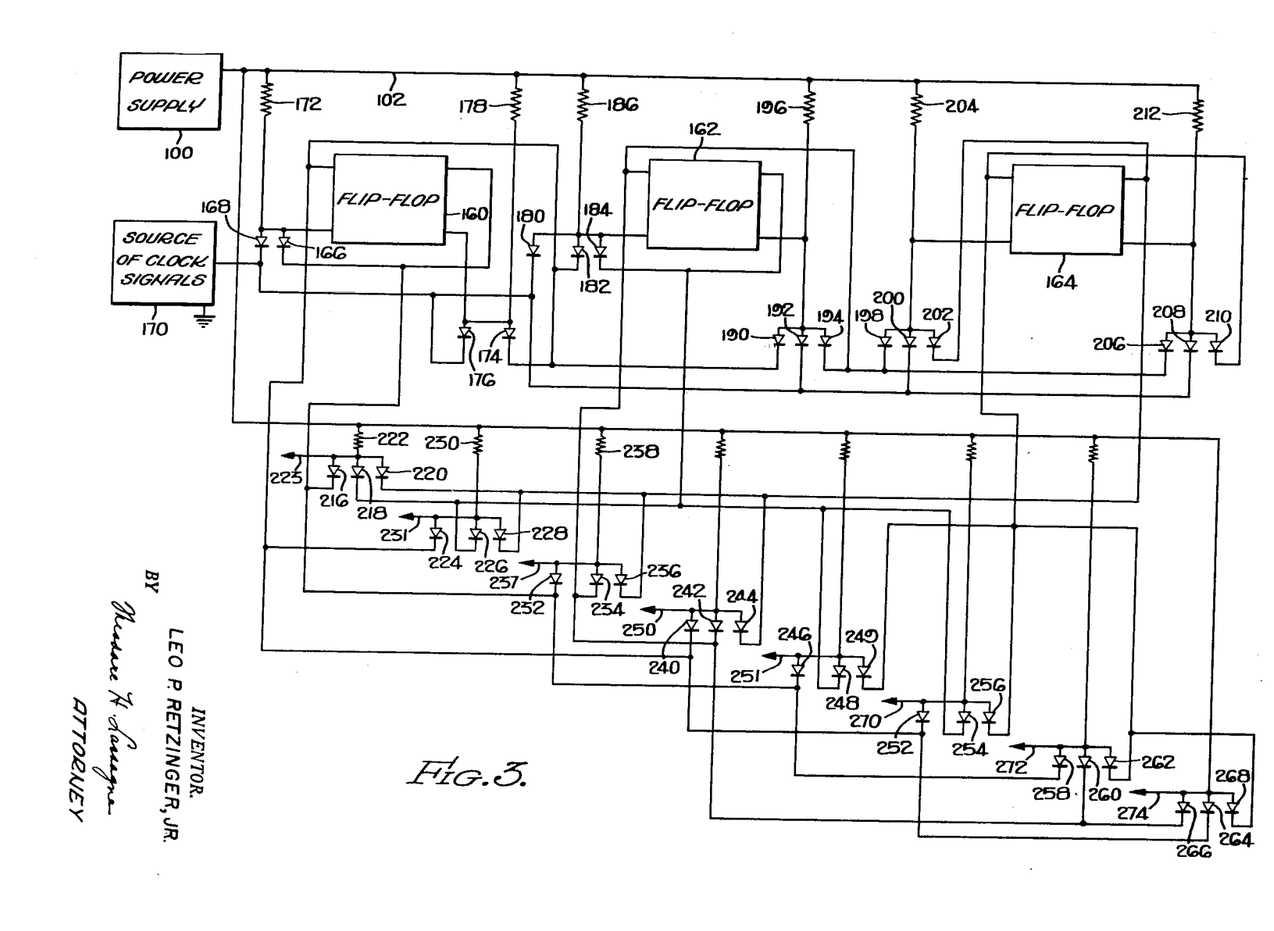

The electrical system shown in block form in FIGURES 2, 3 and 4 is adapted to operate in conjunction with the apparatus shown in FIGURE 1 and disclosed above to control the sequential activation of the brushes and to provide a plurality of signals representing the analogue quantity in digital form. In FIGURE 2, a flip-flop and stages associated with the flip-flop are shown. The flip-flop and its associated stages are adapted to receive voltages from a power supply 100, which is adapted to supply a relatively high positive potential such as +250 volts on a line 102, an intermediate positive potential such as +100 volts on a line 104 and a negative potential such as −150 v. on a line 106.

The line 102 is connected through a resistance 108 to the plate of a vacuum tube 110, the cathode of which is grounded. The grid of the tube 110 is biased in potential through a resistance 111 connected to the line 106. The grid of the tube 110 is also connected to the plate of a diode 112, the cathode of which has a common terminal with a grounded resistance 113 and with a capacitance 114. The capacitance 114 is connected to a logical network 115. Logical networks corresponding to the network 115 are shown in detail in FIGURE 4 and will be fully disclosed hereinafter.

Voltage is also applied to the grid of the tube 110 through a parallel combination of a resistance 116 and a capacitance 118 connected to the plate of a tube 120. The tube 120 has characteristics and connections similar to the tube 110 and may constitute one half of a double triode, the tube 110 constituting the other half. For example, the plate of the tube 120 has voltage applied to it from the line 102 through a resistance 122 corresponding to the resistance 108 and the cathode of the tube is grounded.

A biasing potential is applied to the grid of the tube 120 from the line 106 through a resistance 124 corresponding to the resistance 111. Voltage is also applied to the grid of the tube 120 from a parallel combination of a resistance 125 and a capacitance 126 connected to the plate of the tube 110. The resistance 125 and the capacitance 126 have values corresponding to the resistance 116 and the capacitance 118, respectively. In addition to its other connections, the grid of the tube 120 is connected to the plate of a diode 127, the cathode of which has a common terminal with a grounded resistance 128 and with a capacitance 129. The capacitance 129 is connected to a logical network 130 corresponding to the network 115.

In addition to being connected to the resistance 108, the plate of the tube 110 is connected to a resistance 134 and a capacitance 136 in parallel with each other. Connections are made from the parallel combination of the resistance 134 and the capacitance 136 to a grounded resistance 138 and the grid of a tube 140. The plate of the tube 140 has a voltage applied to it from the line 102. The cathode of the tube 140 serves as one of the output terminals for the circuitry shown in FIGURE 2, as will be disclosed in detail hereinafter. For this reason, an output line 141 extends from the cathode of the tube. The cathode of the tube 140 is connected to a grounded resistance 142 and to the cathode of a diode 144. The plate of the diode 144 receives voltage from the line 104.

Similarly, the voltage on the plate of the tube 120 is applied to a resistance 146 and a capacitance 148. The resistance 146 and the capacitance 148 are connected in parallel and are provided with values respectively corresponding to those of the resistance 134 and the capacitance 136. The resistance 146 and the capacitance 148 are connected to a grounded resistance 150 corresponding in value to the resistance 142 and to the grid of a tube 152. The tube 152 may constitute one-half of a double triode and the tube 140 the other half.

Voltage is applied to the plate of the tube 152 from the line 102, and voltage is produced on the cathode of the tube 152 upon the flow of current through a grounded resistance 154 connected to the cathode of the tube and having a value corresponding to that of the resistance 142. An output line 155 extends from the cathode of the tube 152. Connections are made from the cathode of a diode 156 to the cathode of the tube 152 and from the plate of the diode 156 to the line 104. The diode 156 has characteristics corresponding to the diode 144.

The tubes 110, 120, 140 and 152 and their associated components form a flip-flop "package" in which input voltages are introduced to the flip-flop by voltages applied to the grids of the tubes 110 and 120 and in which output voltages are taken from the flip-flops at the cathodes of the tubes 140 and 152. Flip-flops 160, 162 and 164 corresponding to the flip-flop package shown in FIGURE 2 and disclosed above are shown in block form in FIGURE 3. Input voltages to each of the flip-flops 160, 162 and 164 are shown as applied to the lower left and right terminals in the block representing the flip-flop, and output voltages are shown as being taken from upper left and right terminals in the block.

Voltage is applied to the left input terminal in the flip-flop 160 through a logical network formed by diodes 166 and 168 and corresponding to the logical network 115 shown in FIGURE 2. The cathode of the diode 166 receives voltage from the right output terminal in the flip-flop 160 and the cathode of the diode 168 has signals applied to it from a source 170 of clock signals. The source 170 may be a blocking oscillator or it may be a clock channel of a magnetic drum in an electronic computer, the clock channel being operative to produce cyclic signals when the drum rotates. The electronic computer may be a digital differential analyzer or it may be a digital computer of various types. The plates of the diodes 166 and 168 are connected to the left input terminal in the flip-flop 160 and to one terminal of a resistance 172, the other terminal of which is connected to the line 102.

In like manner, the right input terminal in the flip-flop 160 has a voltage applied to it from the plates of diodes 174 and 176. The plates of the diodes 174 and 176 are also connected to one terminal of a resistance 178 corresponding in value to the resistance 172, the other terminal of the resistance 178 being connected to the line 102. Voltages are respectively applied to the cathodes of the diodes 174 and 176 from the left output terminal of the flip-flop 160 and from the signal source 170.

The left input terminal of the flip-flop 162 receives signals from the plates of diodes 180, 182 and 184. A resistance 186 corresponding in value to the resistances 172 and 178 is connected between the line 102 and the plates of the diodes 180, 182 and 184. The cathodes of the diodes 180, 182 and 184 are in turn respectively connected to the signal source 170, the left output terminal in the flip-flop 160 and the right output terminal in the flip-flop 162.

In like manner, connections are made from the right input terminal in the flip-flop 162 to the plates of diodes 190, 192 and 194 and to one terminal of a resistance 196. The resistance 196 corresponds in value to the resistance 172 and has its other terminal connected to the line 102. Voltages are respectively applied to the cathodes of the diodes 190, 192 and 194 from the left output terminal in the flip-flop 160, from the signal source 170 and from the left output terminal in the flip-flop 162.

The left input terminal of the flip-flop 164 is connected to the plates of diodes 198, 200 and 202 and to one terminal of a resistance 204 corresponding in value to the resistance 172. The other terminal of the resistance 204 is connected to the line 102. The cathodes of the diodes 198, 200 and 202 respectively receive voltages from the left output terminal in the flip-flop 162, the signal source 170 and the right output terminal in the flip-flop 164.

The right input terminal of the flip-flop 164 has a voltage applied to it from the plates of diodes 206, 208 and 210. A resistance 212 corresponding in value to the resistance 172 is connected between the line 102 and the plates of the diodes 206, 208 and 210. Connections are respectively made to the cathodes of the diodes 206, 208 and 210 from the left output terminal in the flip-flop 162, the signal source 170 and the left output terminal in the flip-flop 164.

The output terminals in the flip-flops 160, 162 and 164 are connected to groups of diodes in different patterns to provide a count of the signals from the source 170. For example, the right output terminals in the flip-flops 160, 162 and 164 are respectively connected to the cathodes of diodes 216, 218 and 200. The plates of the diodes are connected to one terminal of a resistance 222, the other terminal of the resistance 222 being connected to the line 102. An output line 223 is connected to the plates of the diodes 216, 218 and 220.

In like manner, the cathodes of diodes 224, 226 and 228 are respectively connected to the left output terminal in the flip-flop 160 and to the right output terminals in the flip-flops 162 and 164. A resistance 230 corresponding in value to the resistance 222 is connected between the plates of the diodes 224, 226 and 228 and the line 102. An output line 231 is also connected to the plates of the diodes 224, 226 and 228.

The cathodes of diodes 232, 234 and 236 respectively receive voltages from the right output terminal in the flip-flop 160, the left output terminal in the flip-flop 162 and the right output terminal in the flip-flop 164. The plates of the diodes 232, 234 and 236 have a common connection with one terminal of a resistance 238, the other terminal of which is connected to the line 102 and which corresponds in value to the resistance 222. An output line 237 receives the voltages on the plates of the diodes 232, 234 and 236.

Similarly, the cathodes of diodes 240, 242 and 244 respectively receive voltages from the left output terminals in the flip-flops 160 and 162 and the right output terminal in the flip-flop 164. Voltages are applied to the cathodes of diodes 246, 248 and 249 from the right output terminals in the flip-flops 160 and 162 and the left output terminal in the flip-flop 164, respectively. The diodes 240, 242 and 244 and the diodes 246, 248 and 249 form logical "and" networks in a manner similar to the diodes 216, 218 and 220, as will be disclosed in detail hereinafter. Output lines 250 and 251 are respectively connected to the plates of the diodes 240, 242 and 244 and to the plates of the diodes 246, 248 and 249.

Connections are respectively made to the cathodes of diodes 252, 254 and 256 from the left output terminal in the flip-flop 252, the right output terminal in the flip-flop 162 and the left output terminal in the flip-flop 164. The cathodes of diodes 258, 260 and 262 respectively receive voltages from the right output terminal in the flip-flop 160 and the left output terminals in the flip-flops 162 and 164. The left output terminals in the flip-flops 160, 162 and 164 have common connections with the cathodes of diodes 264, 266 and 268, respectively. The voltages on the plates of the diodes 252, 254 and 256, the diodes 258, 260 and 262 and the diodes 264, 266 and 268 are introduced to output lines 270, 272 and 274, respectively.

The components shown in FIGURE 3 and described above form a counter for counting from "0" to "7" and for indicating a new count upon a count of "8." For counts higher than "7," additional flip-flops corresponding to the flip-flops 160, 162 and 164 and additional logical networks similar to those shown in FIGURE 3 can be added. It is believed that a person skilled in the art would understand from the disclosure in this specification how to construct such additional stages.

The count provided by the counter shown in FIGURE 3 can be determined at any instant by the voltages on the lines 223, 231, 237, 250, 251, 270, 272 and 274. The counter shown in detail in FIGURE 3 is illustrated in block form at 276 in FIGURE 4 and the output lines 223, 231, 237, 250, 251, 270, 272 and 274 are shown as extending from the counter. Connections are made from the lines 223, 231, 237, 250, 251, 270, 272 and 274 to the cathodes of diodes 280 and 282, 284 and 286, 288 and 290, 292 and 294, 296 and 298, 300 and 302, 304 and 306 and 308 and 310, respectively.

The cathodes of diodes 314, 316, 318, 320, 322 and 324 are respectively connected to the brush 26 and the leading brushes 28, 32, 36, 40 and 44 shown in FIGURE 1. In addition to being considered as receiving means, the brushes may be considered as digitally allocated switching means controlled by the disc 10, which may be considered as digitally allocated switch control means. Connection are also made to the cathodes of diodes 326 and 328 from brushes in additional rows (not shown) in the disc 10 or in rows of other discs coupled as by gears to the disc 10. Other brushes may be connected to the cathodes of diodes corresponding to the diodes 314 and 316 in a manner similar to that disclosed above.

Similarly, the cathodes of diodes 332, 334, 336, 338, 340 and 342 are respectively connected to the brush 26 and to the trailing brushes 30, 34, 38, 42 and 46 shown in FIGURE 1. The cathodes of diodes 344 and 346 are connected to brushes in other rows in a manner similar to that disclosed above for the diodes 326 and 328. Not all of the connections are shown in FIGURE 4 for the purpose of avoiding unnecessary complexity. However, it is believed that a person skilled in the art will understand from this specification, from the brushes shown in the previous figures and from the connections shown in FIGURE 4 how the other connections are to be made.

Connections are respectively made from the cathodes of the diodes 314, 316, 318, 320, 322, 324, 326, 328, 332, 334, 336, 338, 340, 342, 344 and 346 to grounded resistances 352, 354, 356, 358, 360, 362, 364, 366, 368, 370, 372, 374, 376, 378, 380 and 382, having values such as 91,000 ohms. Resistances 380, 382, 384, 386, 388, 390, 392 and 394 are respectively connected between the line 102 and the plates of the diodes 280 and 314, 284 and 316, 288 and 318, 292 and 320, 296 and 322, 300 and 324, 304 and 326 and the diodes 308 and 328. The resistances 380, 382, 384, 386, 388, 390, 392 and 394 all have corresponding values such as approximately 150,000 ohms.

The plates of diodes 396, 398, 400, 402, 404, 406, 408 and 410 respectively have common terminals with the plates of the diodes 280 and 314, 284 and 316, 288 and 318, 292 and 320, 296 and 322, 300 and 324 and the diodes 308 and 328. The cathodes of the diodes 396, 398, 400, 402, 404, 406, 408 and 410 are connected to the plates of diodes 414 and 416. The cathode of the diode 414 receives a voltage from the signal source 170 also shown in FIGURE 3. The cathode of the diode 416 has a voltage applied to it from the left output terminal of a flip-flop designated in block form at 418 in FIGURE 4 and fully shown in FIGURE 2. The left output terminal of the flip-flop 418 corresponds to the cathode of the tube 140 in FIGURE 2. An output line 419 extends from the left output terminal in the flip-flop 418 and an output line 420 extends from the right output terminal in the flip-flop.

In addition to being connected to the plates of the diodes 414 and 416, the cathodes of the diodes 396, 398, 400, 402, 404, 406, 408 and 410 are connected to a grounded resistance 421 and to one terminal of a capacitance 422. The resistance 421 may have a value such as approximately 1 megohm and the capacitance 422 may have a value such as 100 micromicrofarads. Connections are made from the other terminal of the capacitance 422 to a grounded resistance 424 having a value such as approximately 30,000 ohms and to the cathode of a diode 426. The plate of the diode 426 is connected to the right input terminal of the flip-flop 418. This terminal corresponds to the grid of the tube 120 shown in FIGURE 2. The capacitance 422, the resistance 424 and the diode 426 may actually be considered as part of the flip-flop 418 in accordance with the showing of the flip-flops in FIGURE 2. These components are specifically included in the system shown in FIGURE 4 to facilitate understanding of the operation of the system as the operation will be disclosed hereinafter.

In like manner, resistances 428, 430, 432, 434, 436, 438, 440 and 442 are respectively connected between the line 102 and the plates of the diodes 282 and 332, 286 and 334, 290 and 336, 294 and 338, 298 and 340, 302 and 342, 306 and 344 and the diodes 310 and 346. These resistances have values corresponding to the resistance 380. The plates of diodes 444, 446, 448, 450, 452, 454, 456 and 458 also have common terminals with the plates of the diodes 282 and 332, 286 and 334, 290 and 336, 294 and 338, 298 and 340, 302 and 342, 306 and 344 and the diodes 310 and 346, respectively.

The cathodes of the diodes 444, 446, 448, 450, 452, 454, 456 and 458 are connected to the cathode of a diode 460 and to the plate of a diode 462. The plates of the diode 460 and of a diode 464 have voltages applied to them through a resistance 466 from the line 102, the resistance 466 having a value corresponding to that of the resistance 380. The cathode of the diode 464 receives voltage from the left output terminal in the flip-flop 418.

The cathode of the diode 462 is connected to the signal source 170 and the plate of the diode is connected to a grounded resistance 470 and to the grid of a tube 472. The resistance 470 may have a value such as approximately 1 megohm and the tube 472 may be one half of a double triode such as a Type 5963 double triode. Voltage is applied to the plate of the tube 472 from the line 102, and the cathode of the tube is connected to a grounded resistance 474 having a value such as approximately 33,000 ohms.

The voltage produced on the cathode of the tube 472 is applied to the cathode of a diode 476. The plate of the diode 476 receives signals through a suitable coupling capacitance 478 from the signal source 170. The capacitance 478 may have a suitable value such as approximately 250 micromicrofarads. The plate of the diode 476 is also connected to one terminal of a resistance 480 having a suitable value such as approximately 75,000 ohms. The other terminal of the resistance 480 is connected to the line 102.

In addition to being connected to the plate of the diode 476, the resistance 480 is connected to the cathode of a diode 482. Connections are made from the plate of the diode 482 to one terminal of a resistance 484, one terminal of a capacitance 486 and the plate of a diode 488, the cathode of which receives voltage from the line 104. The resistance 484 may have a value such as approximately 150,000 ohms, and the capacitance 486 may have a value such as approximately 100 micromicrofarads. The other terminal of the resistance 484 receives voltage from the line 102, and the other terminal of the capacitance 486 has a common connection with the cathode of a diode 490 and with a grounded resistance 492 having a value such as approximately 30,000 ohms. The plate of the diode 490 is connected to the left input terminal in the flip-flop 418, corresponding to the grid of the tube 110 in FIGURE 2. The capacitance 486, the resistance 492 and the diode 490 are included in the system shown in FIGURE 4 for the same reasons disclosed above in connection with the inclusion of the capacitance 422, the resistance 424 and the diode 426.

The tubes 110 and 120 are so interconnected that only one of the tubes can be conductive at any one time. For example, the tube 120 may be conductive and the tube 110 non-conductive at a particular instant. Since the tube 120 is conductive, current flows through a circuit including the power supply 100, the line 102, the resistance 122 and the tube. This current produces a voltage drop across the resistance 122 and causes a relatively low voltage to be produced on the plate of the tube 120. This low voltage is introduced to the grid of the tube 152 through the coupling network formed by the resistance 146 and the capacitance 148. Since the grid of the tube 152 has a relatively low voltage applied to it, the tube is cut off and a potential in the order of 100 volts is produced on the cathode of the tube. A potential in the order of 100 volts is produced because of the flow of current through a circuit including the power supply 10, the line 104, the diode 156 and the resistance 154.

The low voltage on the plate of the tube 120 is also introduced to the grid of the tube 110 through the coupling network formed by the resistance 116 and the capacitance 118. This voltage maintains the tube 110 cut off. Since no current flows through the tube 110, the current flowing through the resistance 108 is limited to that flowing through the resistances 108, 125 and 124. This causes a relatively small voltage drop to be produced across the resistance 108, such that the voltage on the plate of the tube 110 is maintained at a potential approaching that on the line 102. A resultant potential is introduced to the grid of the tube 140 through the coupling network formed by the resistance 134 and the capacitance 136 to make the tube 140 conductive. The resultant flow of current through the tube 140 and the resistance 142 causes a relatively high voltage to be produced across the resistance. This voltage is in the order of 125 volts.

When the tube 120 is conductive and the tube 110 is cut off, the introduction of a negative triggering signal from the logical network 115 to the grid of the tube 110 has no effect. However, a negative pulse of voltage from the logical network 130 is differentiated by the capacitance 129 and the resistance 128 to produce a sharp triggering signal. This triggering signal passes through the diode 127, which is included to prevent the passage of positive signals. The negative triggering signal is then introduced to the grid of the tube 120 to cut off the previously conductive tube. The interruption of current flow through the tube 120 causes the voltage on the plate of the tube to rise to a potential approaching that on the line 102. A resultant high voltage is introduced to the grid of the tube 152 to render the tube conductive for the production of a relatively high voltage such as +125 volts across the resistance 154.

The relatively high voltage on the plate of the tube 120 is also introduced to the grid of the tube 110 to render the tube 110 conductive. The resultant flow of current through the resistance 108 and the tube 110 causes a relatively low potential to be produced on the plate of the tube. This potential is introduced to the grid of the tube 140 to cut off the tube so that a potential approximating 100 volts is produced on the cathode of the tube.

A subsequent pulse of voltage from the logical network 115 is differentiated by the capacitance 114 and the resistance 113 to produce a sharp triggering signal. This signal is introduced to the grid of the tube 110 to cut off the tube and to make the tube 120 conductive. This in turn results in a relatively high potential on the cathode of the tube 140 and a relatively low potential on the cathode of the tube 152. In this way, the operation of the flip-flop shown in FIGURE 2 is dependent at any instant upon the signals introduced to the flip-flop from the logical networks 115 and 130.

In accordance with the introduction of the signals from the logical networks 115 and 130, a high potential of approximately 125 volts is produced at any instant on the cathode of one of the tubes 140 and 152 and a potential of approximately 100 volts is produced on the cathode of the other tube. Each of the tubes 140 and 152 serves in a cathode follower stage for preventing loading of the flip-flop and for improving the match in impedances between the outputs from the flip-flop and the following stages.

The flip-flop shown in FIGURE 2 and disclosed above is similar in construction and operation to the flip-flops 160, 162 and 164 shown in FIGURE 3. The flip-flops 160, 162 and 164 are adapted to provide a count from "0" to "7" of the pulses introduced to the flip-flops from the clock signal source 170. The flip-flops 160, 162 and 164 are initially in a state of operation in which a relatively high voltage is produced on the right output terminal of each of the flip-flops. This corresponds to a count of "0."

The relatively high voltage on the right output terminal of the flip-flop 160 for a count of "0" is introduced to the cathode of the diode 166. A high voltage is also normally introduced to the cathode of the diode 168 from the signal source 170. Because of the high voltages on the cathodes of the diodes 166 and 168, relatively little current is able to flow through the resistance 172 and either of the diodes. Since a voltage drop is not produced across the resistance 172, a relatively high voltage is produced on the plates of the diodes 166 and 168.

When a first negative signal is introduced to the cathode of the diode 168 from the signal source 170, a relatively large current flows through the resistance 172 and the diode 168. The current flowing through the resistance 172 produces a voltage drop across the resistance. The voltage drop across the resistance 172 is differentiated in the flip-flop as previously disclosed to produce a negative triggering signal. The negative triggering signal causes the left tube in the flip-flop 160 to become cut off so that a relatively high voltage is produced on the left output terminal of the flip-flop. At the same time, a relatively low voltage is produced on the right output terminal in the flip-flop 160.

The high voltage on the left output terminal in the flip-flop 160 is introduced to the cathode of the diode 174. Since a relatively high voltage is also introduced to the cathode of the diode 176, relatively little current flows through the resistance 178. This causes a relatively high voltage to be produced on the plates of the diodes 174 and 176. Upon the production of a second triggering signal by the signal source 170, the cathode of the diode 176 receives a relatively low voltage and a relatively large current flows through the resistance 178 and the diode. The resultant drop in voltage on the plates of the diodes 174 and 176 is differentiated in the flip-flop 160 to produce a sharp triggering signal. This signal is introduced to the right input terminal in the flip-flop 160 to trigger the flip-flop so that the right tube in the flip-flop 160 becomes cut off and a relatively high potential such as +125 volts is produced on the right output terminal. The production of a relatively high voltage on the right output terminal causes a relatively low voltage such as +100 volts to be produced on the left output terminal, as previously disclosed.

It will be seen that a relatively high voltage is produced on the left output terminal in the flip-flop 160 upon the introduction of odd-numbered signals from the signal source 170. For example, a relatively high voltage is produced on the left output terminal in the flip-flop 160 upon the introduction of first, third, fifth, etc., signals from the signal source 170. Similarly, a relatively high voltage is produced on the right output terminal of the flip-flop 160 when second, fourth, sixth, etc., signals are introduced from the signal source 170.

The production of a relatively high voltage on the left output terminal of the flip-flop 160 can be logically expressed as $$b_1 = \overline{B_1} C \qquad (1)$$

where $b_1$ = a triggering signal introduced to the left input terminal in the flip-flop 160;
$\overline{B_1}$ = a relatively high voltage on the right output terminal in the flip-flop 160; and
$C$ = a triggering signal from the signal source 170. In accordance with standard computer terminology, the terms "$\overline{B_1}$" and "$C$" written together indicate an "and" network, such that a triggering signal cannot pass unless both terms are simultaneously true.

Similarly, the production of a relatively high voltage on the right output terminal of the flip-flop 160 can be logically expressed as $$\overline{b_1} = B_1 C \qquad (2)$$

where $\overline{b_1}$ = a triggering signal introduced to the right input terminal in the flip-flop 160;
$B_1$ = a relatively high voltage on the left output terminal in the flip-flop 160; and
$C$ = a triggering signal from the source 170.

As previously disclosed, a relatively high voltage is produced on the left output terminal in the flip-flop 160 after the introduction of the first signal from the source 170. This voltage is introduced to the cathode of the diode 182. A relatively high voltage is also introduced at the same time to the cathode of the diode 184 from the right output terminal in the flip-flop 162. This prepares the logical network formed by the diodes 180, 182 and 184 for the passage of a triggering signal from the source 170 to the left input terminal in the flip-flop 162. The triggering signal passing to the left input terminal in the flip-flop 162 causes a relatively high voltage to be produced on the left output terminal in the flip-flop and a relatively low voltage to be produced on the right output terminal.

The high voltage produced on the left output terminal in the flip-flop 162 is introduced to the cathode of the diode 194. This causes the logical network formed by the diodes 190, 192 and 194 to become prepared for operation the next time that a relatively high voltage is produced on the left output terminal in the flip-flop 160. A signal then passes through the logical network formed by the diodes 190, 192 and 194 upon the subsequent production of a triggering signal by the source 170. This signal triggers the flip-flop 162 so that a relatively high voltage is again produced on the right output terminal in the flip-flop and a low voltage is produced on the left output terminal in the flip-flop.

It will be seen from the above discussion that the flip-flop 162 changes states of operation every time that a relatively high voltage on the left output terminal in the flip-flop 160 changes to a low value. The introduction of a triggering signal to the left input terminal in the flip-flop 162 is controlled by the following logical equation:

$$b_2 = B_1 \overline{B_2} C \qquad (3)$$

where $b_2$ = a triggering signal introduced to the left input terminal in the flip-flop 162;
$\overline{B_2}$ = a relatively high voltage on the right output terminal in the flip-flop 162; and
the other terms have previously been defined.

Similarly, a triggering signal is introduced to the right input terminal in the flip-flop 162 for the production of a relatively high voltage on the right output terminal in accordance with the logical expression, $$\overline{b_2} = B_1 B_2 C \qquad (4)$$

where $\overline{b_2}$ = a triggering signal introduced to the right input terminal in the flip-flop 162;
$B_2$ = a relatively high voltage on the left output terminal in the flip-flop 162; and
the other terms have previously been defined.

Just as the triggering of the flip-flop 162 is controlled by the voltage on the left output terminal in the flip-flop 160, the operation of the flip-flop 164 is controlled by the voltage on the left output terminal in the flip-flop 162. In this way, the logical equation controlling the production of a relatively high voltage on the left output terminal in the flip-flop 164 can be given as $$b_3 = B_2 \overline{B_3} C \qquad (5)$$

where $b_3$ = a triggering signal introduced to the left input terminal in the flip-flop 164;
$\overline{B_3}$ = a relatively high voltage on the right output terminal in the flip-flop 164; and
the other terms have previously been defined.

Similarly, a relatively high voltage is produced on the right output terminal in the flip-flop 164 in accordance with the logical equation $$\overline{b_3} = B_2 B_3 C \qquad (6)$$

where $\overline{b_3}$ = a triggering signal introduced to the right input terminal in the flip-flop 164;
$B_3$ = a relatively high voltage on the left output terminal in the flip-flop 164; and
the other terms have previously been defined.

The chart shown in FIGURE 5 represents the states of the flip-flops 160, 162 and 164 after the introduction of successive triggering signals from the signal source 170. The letter "L" represents a relatively high voltage on the left output terminal in the particular flip-flop and the letter "R" represents a relatively high voltage on the right output terminal in the flip-flop. As will be seen, the flip-flops 160, 162 and 164 assume a different pattern of operation upon the introduction of each successive triggering signal.

Diode networks are formed in accordance with the particular patterns of operation shown in FIGURE 5 for the flip-flops 160, 162 and 164. For example, the right output terminals of the flip-flops 160, 162 and 164 are respectively connected to the cathodes of the diodes 216, 218 and 220 in FIGURE 3 to represent the value "0." This is in accordance with the chart shown in FIGURE 5. Because of these connections, relatively little current flows through the resistance 222 and the diodes 216, 218 and 220 for a value of "0." This causes a relatively high output voltage to be produced on the line 223 for a value of "0."

As another example, FIGURE 5 shows that for a count of "3" high voltages are produced on the left output terminals in the flip-flops 160 and 162 and on the right output terminal in the flip-flop 164. As a result, these output terminals are connected to the cathodes of the diodes 240, 242 and 244 in FIGURE 3 so that a high output voltage will be produced on the line 250 only for a count of "3." Similarly, the different diode networks corresponding to that formed by the diodes 240, 242 and 244 provide a high output voltage for particular integers between "0" and "7."

The voltages produced on the output terminals of the counter shown in FIGURE 3 and disclosed above are introduced to the logical networks shown in FIGURE 4 to prepare particular networks for operation. This counter is illustrated in block form at 276 in FIGURE 4. For example, the networks formed by the diodes 280 and 314 and by the diodes 282 and 332 are first prepared for operation because of the high voltage produced on the output line 223 for a count of "0." When a relatively high voltage is introduced to the cathode of the diode 314 from the brush 26 at the same time that a high voltage is produced on the line 223, relatively little current is able to flow through a circuit including the resistance 380 and the diodes. This causes the voltage on the plates of the diodes to be relatively high.

The voltage produced on the plates of the diodes 280 and 314 remains high until the time that a first signal is produced by the signal source 170. During this time, a relatively high voltage is also introduced to the cathode of the diode 414 from the signal source 170. If a relatively high voltage is provided on the left output terminal in the flip-flop 418 during this time, a relatively high voltage is also introduced to the cathode of the diode 416. Because of the introduction of high voltages to the cathodes of the diodes 414 and 416 and the production of a high voltage on the plates of the diodes 280 and 314, current is able to flow through a circuit including the power supply 100, the line 102, the resistance 380, the diode 396, and the resistance 421. This current produces a positive voltage across the resistance 421.

Upon the production of a first signal by the source 170, a relatively low voltage is produced on the cathode of the diode 414. This low voltage causes the voltage on the plate of the diode 414 to drop since the low impedance of the diode from its plate to its cathode prevents the voltage on the plate from materially exceeding the voltage on the cathode. The low voltage on the plate of the diode 414 prevents current from flowing through the resistance 421 and causes the voltage across the resistance to drop to approximately 100 volts.

The voltage across the resistance 421 drops fairly quickly from a value of approximately 125 volts to a value of approximately 100 volts and produces a negative pulse having a relatively sharp leading pulse. This pulse is differentiated by the capacitance 422 and the resistance 424 and is introduced through the diode 426 to the right input terminal in the flip-flop 418. This signal triggers the flip-flop to produce a relatively high voltage on the right output terminal in the flip-flop 418 and a relatively low voltage on the left output terminal in the flip-flop.

The leading edge of the negative pulse produced across the resistance 421 in a manner similar to that disclosed above is considerably sharper than the leading edges of noise signals which may be produced in the circuit. The difference in the sharpness of the true and spurious signals is accentuated by the operation of the capacitance 422 and the resistance 424 so that the true pulse has a considerably greater amplitude than the noise signals.

In this way, the flip-flop 418 is triggered only by true pulses produced in the circuit.

When the first triggering signal is produced by the source 170, the voltage on the line 223 becomes low. This prevents the networks formed by the diodes 280 and 314 and by the diodes 282 and 332 from becoming activated. This results from the fact that current then flows through circuits such as the power supply 100, the resistance 380 and the diode 280. The resultant voltage drop across the resistance 380 causes the voltage on the plates of the diodes to be relatively low and prevents current from flowing through the resistance 421 to produce a voltage drop across the resistance. In like manner, the network formed by the diodes 282 and 332 operates to prevent a voltage from being produced across the resistance 470.

The first signal from the source 170 not only causes the voltage on the line 223 to become low but also causes the voltage on the line 231 to become high. This high voltage is introduced to the cathodes of the diodes 284 and 286 to prepare the networks formed by the diodes 284 and 316 and by the diodes 286 and 334 for activation. If the brush 28 should have a relatively high voltage, the network formed by the diodes 284 and 316 would become activated. However, the voltage on the ungrounded terminal of the resistance 421 would remain relatively low because of the introduction of a relatively low voltage from the left output terminal in the flip-flop 418 to the cathode of the diode 416. This low voltage is produced as disclosed above by the operation of the network formed by the diodes 280 and 314. Since no positive voltage is produced across the resistance 421, a negative pulse cannot subsequently be produced across the resistance for any triggering action on the flip-flop 418.

As disclosed above, the network formed by the diodes 286 and 334 is also prepared for activation by the production of a relatively high voltage on the line 231. If the brush 30 has a high voltage, a high voltage is produced on the plates of the diodes 286, 334 and 446 in a manner similar to that disclosed above. This voltage causes increased current to flow through a circuit including the diode 446 and the resistance 470.

The relatively high potential of 125 volts produced on the ungrounded terminal of the resistance 470 by the flow of current through the resistance is introduced to the grid of the tube 472 to make the tube conductive. Current then flows through the tube 472 and the resistance 474 and causes a positive potential to be produced across the resistance. Since a relatively high potential is produced across the resistance 474, reduced current will flow through a circuit including the resistance 480 and the diode 476. This causes a relatively high voltage to be produced on the cathode of the diode 482. The positive potential produced on the cathode of the diode 482 is greater than the potential on the plate of the diode. This low voltage on the plate of the diode 482 results from the flow of current through a circuit including the power supply 100, the line 102, the resistance 484 and the diode 488. The voltage on the cathode of the diode 482 is sufficiently greater than the voltage on the plate so that a negative signal introduced to the cathode through the capacitance 478 from the source 170 cannot drive the cathode of the diode negative with respect to its plate. This prevents a signal from passing to the left input terminal in the flip-flop 418 to trigger the flip-flop into its alternate state of operation.

If the brush 30 is not in contact with a conductive portion in the disc 10 at the time that a high voltage is produced on the line 231, current flows through a circuit including the power supply 100, the resistance 430, the diode 334 and the resistance 370. This current produces a drop in the potential on the plate of the diode 446 and causes a relatively low voltage to be introduced through the diode 446 to the cathode of the diode 460. A relatively low voltage is also introduced to the cathode of the diode 464 from the left output terminal in the flip-flop 418 because of the previous triggering of the flip-flop. This causes a relatively low voltage to be introduced to the resistance 470.

The low voltage produced across the resistance 470 is introduced to the grid of the tube 472 to cut off, or at least minimize, the current through the tube. This in turn causes a relatively low voltage to be produced across the resistance 474. Because of this low voltage, increased current flows through a circuit including the resistance 480 and the diode 476. The resultant voltage drop across the resistance 480 causes the voltage on the cathode of the diode 482 to approach in value the voltage on the plate.

During the production of a relatively low voltage on the cathode of the diode 482, the introduction of a negative triggering signal from the source 170 causes the voltage on the cathode of the diode 482 to fall below the voltage normally on the plate of the diode. Since the plate of a diode normally cannot have a higher voltage than the cathode of the diode, the voltage on the plate of the diode 482 follows the voltage on the cathode of the diode. The resultant negative pulse of voltage is differentiated by the capacitance 486 and the resistance 492 and is introduced through the diode 490 to the left input terminal in the flip-flop 418. This signal triggers the flip-flop 418 into its alternate state of operation such that a relatively high voltage is produced on the left output terminal in the flip-flop and a relatively low output voltage is produced on the right output terminal.

Since the voltage produced on the left output terminal in the flip-flop 418 is introduced to the cathode of the diode 464, the operation of the logical network formed by the diodes 460 and 464 is controlled in part by this voltage. As has been previously disclosed, a triggering signal is able to be produced for introduction to the left input terminal in the flip-flop 418 when the voltage introduced to the cathode of the diode 464 from the flip-flop is relatively low.

When a relatively high voltage is introduced to the cathode of the diode 464 from the left output terminal in the flip-flop 418, this voltage controls the output of the network formed by the diodes 460 and 464. This high voltage produces a flow of current through the resistance 470, a resultant flow of current through the tube 472 and a relatively high voltage on the cathode of the tube 482, as previously disclosed. This high voltage prevents a signal from passing through the diode 482 when a negative signal is produced by the signal source 170. A signal cannot pass to the flip-flop 418 regardless of the operation of any of the logical networks shown at the bottom of FIGURE 4. These networks correspond to those formed by the diodes 282 and 332 and by the diodes 286 and 334.

The voltage produced on the left output terminal in the flip-flop 418 is introduced to the cathode of the diode 416 as well as to the cathode of the diode 464. As previously disclosed, the introduction of a relatively low voltage to the cathode of the diode 416 causes a relatively low voltage to be produced on the plate of the diode. This low voltage causes reduced current to flow through the resistance 421 such that a negative triggering signal cannot be produced by an interruption of current. In this way, a triggering signal cannot pass to the right input terminal in the flip-flop 418 regardless of the operation of any of the logical networks shown at the top of FIGURE 4. These networks correspond to those formed by the diodes 280 and 314 and by the diodes 284 and 316.

Upon the production of a relatively high voltage on the left output terminal of the flip-flop 418, the voltage on the plate of the diode 416 becomes relatively high provided that the diode network formed by the diodes 280, 314 and 284, 316, etc., are activated. When this occurs, current is able to flow through the resistance 421 when one of the networks at the top of FIGURE 4 becomes activated. In this way, the interruption of the current upon the introduction of a signal from the source 170 causes a negative triggering signal to be introduced to the right input terminal in the flip-flop 418.

It will be seen from the above disclosure that the production of a high voltage on the left output terminal in the flip-flop 418 prepares the networks at the top of FIGURE 4 for activation. Only a particular one of these networks can become activated. The particular network capable of being activated is dependent upon the count of the signals from the source 170, this count being provided by the counter 276 as previously disclosed. The activation of one of the networks produces a signal which is introduced to the right input terminal in the flip-flop 418 to trigger the flip-flop. The introduction of a triggering signal to the right input terminal in the flip-flop 418 can be logically expressed as $$\overline{m_1} = (P_0 S_0^* + P_1 S_1^* + P_2 S_2^* + \cdots P_n S_n^*) MC \quad (7)$$

where $\overline{m_1}$ = a triggering signal introduced to the right input terminal in the flip-flop 418;
$P_0$ = a relatively high voltage on the line 223 to indicate a count of "0" in the counter 276;
$S_0^*$ = a relatively high voltage on the brush 26;
$P_1$ = a relatively high voltage on the line 231 to indicate a count of "1" in the counter 276;
$S_1^*$ = a relatively high voltage on the brush 28;
$P_2$ = a relatively high voltage on the line 237 to indicate a count of "2" in the counter 276;
$S_2^*$ = a relatively high voltage on the brush 32;
$P_n$ = a relatively high voltage on a particular output line from the counter 276 to indicate a count of "n";
$S_n^*$ = a relatively high voltage on the nth brush in the first series of brushes corresponding to the brushes 26, 28, 32, 36, 40 and 44;
$M$ = a relatively high voltage on the left output terminal in the flip-flop 418; and
$C$ = a triggering signal from the source 170.

As is well-known in computer terminology, the "+" sign indicates an "or" relationship which would cause $\overline{m_1}$ to become true when any of the terms such as $P_0 S_0^*$, $P_1 S_1^*$, etc., become true.

It will also be seen from the above disclosure that a triggering signal can pass to the right input terminal in the flip-flop 418 only when a relatively high voltage has been produced on the left output terminal of the flip-flop. Furthermore, a triggering signal is able to pass to the left input terminal in the flip-flop 418 only when none of the networks shown at the bottom of FIGURE 4 becomes activated by the production of a relatively high voltage on the plates of the diodes in the network. For these reasons, the logical equation controlling the introduction of a triggering signal to the left input terminal in the flip-flop 418 can be expressed as $$(m_L) = (P_0 S_0^* + P_1 S_1 + P_2 S_2 + \cdots P_n S_n + M) C \quad (8)$$

where $(m_L)$ = the lack of introduction of a signal to the left input terminal in the flip-flop 418 upon the occurrence of any of the terms within the parentheses to the right of the "equal" (=) sign;
$S_0^*$ = a relatively high voltage on the brush 26;
$S_1$ = a relatively high voltage on the brush 30;
$S_2$ = a relatively high voltage on the brush 34;
$S_n$ = a relatively high voltage on the nth brush in the second series of brushes including the brushes $S_0^*$, $S_1$, $S_2$, etc.;

and the other terms have previously been defined.

It should be appreciated that the flip-flop 418 not only controls the selection of the particular brush in the successive pairs of brushes, but also provides signals representing the output from the brushes. These indications are represented by the pattern of high and low voltages on the output lines 419 and 420. A low voltage on the line 420 represents a value of "0" for a particular binary digit and a high voltage on the line 420 represents a value of "1" for the binary digit.

Figure 6:
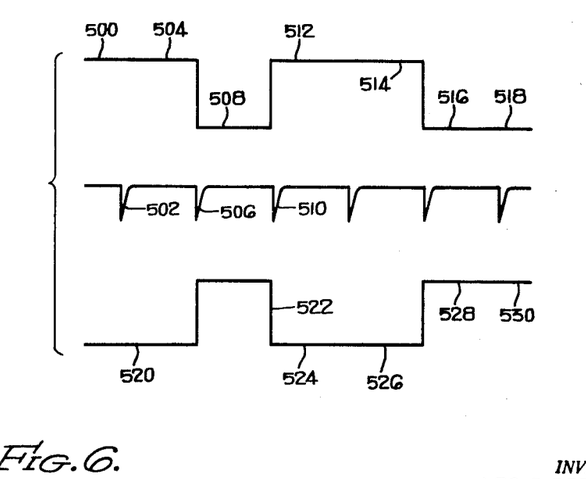
FIGURE 6 illustrates curves representing the operation of the system shown in FIGURES 2, 3 and 4 to obtain an analogue-to-digital conversion for a particular analogue value.

The operation of the system shown in FIGURES 2, 3 and 4 will now be explained with reference to a particular example, as shown in FIGURE 6. In this example, a particular pattern of signals is produced on the output lines 419 and 420 upon the occurrence of successive clock signals from the source 170. As shown in FIGURE 6, a relatively high voltage illustrated at 500 is initially produced on the output line 419 before the introduction of a first clock signal 502. This causes the networks illustrated at the top of FIGURE 4 to become prepared for operation. When the brush 26 is not contacting one of the conductive portions in its associated row, a triggering signal does not pass through the capacitance 422 to the right input terminal in the flip-flop 418. This causes a high voltage to continue on the left output terminal in the flip-flop 418, as illustrated at 504 in FIGURE 6.

Because of the high voltage 504 on the left output terminal of the flip-flop 418, the "and" network formed by the diodes 284 and 316 becomes prepared for activation upon the occurrence of a second clock signal 506. A signal is produced in this network if the brush 28 is contacting a conductive portion in its associated row. This signal passes through the capacitance 422 to the right input terminal in the flip-flop 418 and triggers the flip-flop to produce a high voltage on the right output terminal and a low voltage on the left output terminal. The low voltage on the left output terminal in the flip-flop 418 and on the line 419 is illustrated at 508 in FIGURE 6.

The low voltage 508 prepares the networks shown at the bottom of FIGURE 4 for operation. Because of the operation of the pulse counter 276, only the network formed by the diodes 290 and 336 actually becomes prepared. If the brush 34 does not contact a conductive portion in its associated row, a signal does not pass through the network formed by the diodes 290 and 336 upon the occurrence of a third clock signal 510. The absence of any signal from the network causes a signal to pass to the left input terminal in the flip-flop 418 to trigger the flip-flop into its alternate state so that a high voltage is produced on the left output terminal of the flip-flop and a low voltage is produced on the right output terminal. The high voltage on the left output terminal in the flip-flop 418 and on the output line 419 is illustrated at 512 in FIGURE 6.

The high voltage 512 and the pulse counter 276 prepare the network formed by the diodes 292 and 320 for operation. When the brush 36 is not contacting a conductive portion in its associated row, a signal does not pass to the right input terminal in the flip-flop 418 and a high voltage continues on the left output terminal, as illustrated at 514 in FIGURE 6.

Upon the occurrence of the next clock pulse, a signal passes through the network formed by the diodes 296 and 322 when the brush 40 contacts a conductive portion. This signal causes the flip-flop 418 to become triggered so that a low voltage illustrated at 516 is produced on the left output terminal of the flip-flop. A low voltage illustrated at 518 is also produced on the left output terminal of the flip-flop 418 upon the introduction of the next triggering signal. This results from the contact made by the brush 46 with a conductive portion in its associated row. As previously disclosed, such a contact prevents a signal from passing to the left input terminal of the flip-flop 418 to trigger the flip-flop into a state for producing a high voltage on the left output terminal.

The output signals representing the analogue quantity in digital form are taken on the line 420 from the right output terminal in the flip-flop. These signals are indicated in FIGURE 6 at 520, 522, 524, 526, 528 and 530.

The digital number represented by the signals 520, 522, 524, 526, 528 and 530 on the right output terminal of the flip-flop 418 can be indicated digitally as 010011, where the least significant digit is at the left. This number is equivalent in decimal form to $$(0)(2^0)+(1)(2^1)+(0)(2^2)$$
$$+(0)(2^3)+(1)(2^4)+(1)(2^5)=50$$

The decimal value 50 represents the analogue quantity which is converted into digital form by the system constituting this invention.

The apparatus disclosed above has several important advantages. It converts an analogue quantity such as the angular position of a shaft into a corresponding digital representation without the use of any moving parts other than the shaft itself. The apparatus effectuates this result by utilizing a flip-flop such as the flip-flop 418 and by controlling the operation of the flip-flop through a plurality of logical networks. These logical networks may be arranged relative to each other in a manner similar to that disclosed in Equations 7 and 8.

It should be appreciated that the apparatus disclosed above can be used to detect other analogue quantities than the angular position of a shaft. Actually, the apparatus can be used to detect the movement of any information member having a plurality of conductive and non-conductive portions arranged in rows. The movement of the information member can be linear as well as angular or can be a combination of both.

The signals produced by the flip-flop 418 to represent successive digits in a multi-digital number are produced every time that a triggering signal is introduced from the source 170. Since the flip-flop 418 and the logical networks associated with the flip-flop can operate at relatively high frequencies, their operation is limited only by the rate at which signals can be produced by the source 170 and by capacitance, resistance and power considerations.

The triggering signals from the source 170 can be produced at a relatively high frequency in the order of hundreds of thousands and even millions of times a second. For example, when the source 170 represents the clock channel in the magnetic drum of an electronic computer, the clock signals can be produced at the rate of approximately 200,000 times a second. And, in the computer field, it is well-known that a magnetic drum represents a relatively slow type of memory.

When the apparatus constituting this invention is used with equipment capable of producing triggering signals at approximately only 200,000 times a second, a conversion of an analogue quantity into a corresponding digital quantity having as many as 18 binary digits can be effectuated in approximately 18/200000 second. In such a short period of time, information members such as the disc 10 can move only an infinitesimal amount. The infinitesimal amount can at most affect the least significant digit in a measurement. In a digital quantity represented by 18 binary digits, this would produce an error of considerably less than 0.01%. For this reason, accurate measurements can be obtained even while the information member such as the disc 10 is being moved relative to its associated brushes.

As used in the claims, the term "and" network refers to a network such as that formed by the diodes 280 and 314. In such a network, a signal cannot be produced unless signals are simultaneously introduced to all of the diodes in the network. The term "or" network refers to a network such as that formed by the diodes 396, 398, 400, 402, 404, 406, 408 and 410. The network formed by the particular diodes disclosed in the previous sentence operates to pass a signal when a signal passes through any of the diodes in the network. The term "electrical circuitry" as used in the claims includes the diodes, tubes, resistances and other components which are connected together to control the sequential production of signals representing the digital equivalent of the analogue input. As used in the claims, the term "bistable member" includes the flip-flop shown in FIGURE 2 and other types of flip-flops. It also includes any circuit which operates to simultaneously produce a first voltage of high amplitude and a second voltage of low amplitude and vice versa.

I claim:

1. An analogue-to-digital converter, including, an information member having a plurality of first and second portions arranged in rows, the first and second portions in each row being alternately arranged relative to one another, the first and second portions in each row having lengths proportionately related to the lengths of the first and second portions in adjacent rows, a plurality of receiving means each associated with the first and second portions in a different row to produce signals in accordance with its disposition relative to the associated first and second portions, a bistable member having first and second states of operation, and a plurality of electrical networks associated with the bistable member and the different receiving means to render the receiving means in successive rows sequentially active for the triggering of the bistable member into one of its two states of operation in accordance with the positioning of the active receiving means relative to its associated first and second portions.

2. An analogue-to-digital converter, including, an information member having a plurality of first and second portions arranged in rows, each successive row having a progressively decreasing number of alternately conductive and non-conductive portions in a particular space, at least one plurality of receiving means, each receiving means in the plurality being positioned in contiguous relationship to a different row of first and second portions to provide signals dependent upon its positioning adjacent to a first or second portion, a bistable member having first and second states of operation, and a plurality of electrical "and" networks and "or" networks associated with the receiving means and with the bistable member to read the signals on the receiving means in successive rows for the triggering of the bistable member into its first and second states of operation in a pattern dependent upon the signals in the receiving means.

3. An analogue-to-digital converter, including, an information member having a plurality of first and second portions arranged in rows, the first and second portions in each row being alternately disposed relative to each other and having lengths greater by a particular mathematical relationship than the lengths of the portions in the preceding row, a plurality of paired receiving means, each pair of receiving means being associated with a different row of first and second portions, the receiving means in each pair being disposed at a particular distance from each other dependent upon the length of the portions in the associated row, a bistable member having first and second states of operation, electrical circuitry for preparing successive pairs of receiving means for activation at spaced intervals of time, electrical circuitry for determining the particular receiving means to be activated in the pair prepared for activation in accordance with the operation of the bistable member in one of its two states, and electrical circuitry for triggering the bistable member into a particular one of its two states in accordance with the signal produced on the activated receiving means.

4. An analogue-to-digital converter, including, an information member having a plurality of first and second portions arranged in rows, the first and second portions in each row being alternately disposed relative to one another, the portions in each row having greater lengths than the portions in the preceeding row, a plurality of receiving means associated with the first and second portions in the different rows for the production of first signals upon a contiguous relationship to the first portions and second signals upon a contiguous relationship to the second portions, a bistable member having first and second states of operation in accordance with the production of the first and second signals in the receiving means, counting means for activiating the receiving means in sequence to sequentially make successive rows available for the production of signals, and means including the bistable member and the counting means for triggering the bistable member into one of its states of operation in accordance with the positioning of the activated receiving means relative to the first and second portions in the associated row.

5. An analogue-to-digital converter, including, an information member having a plurality of first and second portions arranged in rows, the first and second portions of each row being disposed in alternate relationship, the first and second portions in each row being of similar length relative to one another and substantially twice as long as the first and second portions in the preceding row, a plurality of paired receiving means, each pair of receiving means being disposed in contiguous relationship to the first and second portions in a different row, the receiving means in each pair being displaced from each other by a particular distance dependent upon the length of the contiguous first and second portions, counting means having a plurality of terminals and operative to produce signals in sequence at the plurality of terminals, a bistable member having first and second states of operation, each pair of receiving means being associated with a different terminal in the counting means for activation upon the appearance of a signal at the terminal, each receiving means in a pair being associated with the bistable member for selection in accordance with the operation of the bistable member in its first or second states of operation, and means for triggering the bistable member into its first or second states of operation in accordance with the disposition of the selected receiving means relative to its associated first and second portions.

6. An analogue-to-digital converter, including, an information member having a plurality of first and second portions arranged in rows, the first and second portions of each row having a different length than the portions in the other rows, at least one plurality of receiving means disposed in electrical proximity to the first and second portions in the different rows to produce signals in accordance with their disposition relative to the first and second portions, a bistable member having first and second states of operation, means for sequentially preparing for activation the receiving means disposed in electrical proximity to successive rows and for preparing such receiving means for the passage of signals in accordance with the disposition of the receiving means relative to the first and second portions in the associated rows, and electrical circuitry for serially receiving signals from the receiving means in a particular sequence upon the activation of the receiving means and in accordance with the passage of signals from the receiving means and for triggering the bistable member into its first and second states of operation in accordance with the pattern of the received signals.

7. An analogue-to-digital converter, including, an information member having a plurality of first and second portions arranged in rows, the first portions in each row being alternately disposed relative to the second portions in the row, the first and second portions in each row having an increased length of a particular ratio relative to the first and second portions in the preceding row, a plurality of receiving means, particular receiving means in the plurality being paired, each pair of receiving means being disposed in electrical proximity to the first and second portions in a different row and being displaced from each other by a particular distance dependent upon the length of the portions in the row, a bistable member having first and second states of operation, electrical circuitry for sequentially preparing successive pairs of receiving means for activation, electrical circuitry including the bistable member for selecting for activation a particular one of the receiving means in the pair prepared for activation, and electrical circuitry for triggering the bistable member into a particular one of its two states of operation in accordance with the signal produced on the receiving means selected for activation.

8. An analogue-to-digital converter, including, an information member having a plurality of first and second portions arranged in rows, the first and second portions in each row being of progressively increasing length relative to the portions in the preceding row, a plurality of receiving means, particular receiving means being paired, each pair of receiving means being associated with a different row to produce signals in accordance with their disposition relative to the first and second portions in the associated row, a bistable member having first and second states of operation, a plurality of "and" networks each associated with different receiving means, means for sequentially selecting successive pairs of "and" networks, means for selecting a particular "and" network in the selected pair in accordance with the operation of the bistable member in its first or second state, and means for triggering the bistable member in accordance with the signal produced by the receiving means in the selected "and" network.

9. An analogue-to-digital converter, including, an information member having a plurality of first and second portions arranged in rows, the first and second portions in each row being disposed in alternate configuration relative to each other and being of increasing length in a fixed proportion relative to the portions in the preceding row, a plurality of receiving means, particular receiving means being paired, the receiving means in each pair being disposed to obtain signals in accordance with the first portions in a different row and being separated from each other by a distance proportionate to the length of the conductive portions, a bistable member having first and second states of operation, means for providing a plurality of signals, means having a plurality of output terminals for providing a count of the signals, a plurality of logical "and" electrical networks each receiving signals from the bistable member, different receiving means and a different output terminal in the counting means to provide an output signal in accordance with its received signals, and means for triggering the bistable member to one of its two states of operation in accordance with the output signals from the "and" networks.

10. An analogue-to-digital converter, including, an information member having a plurality of first and second portions arranged in rows, the first and second portions in each row having substantially the same length and a length varying by a particular ratio relative to the length in the preceding row, a plurality of receiving means, particular receiving means in the plurality being paired, the receiving means in each pair being disposed in contiguous relationship to a different row of first and second portions and being displaced from each other by a distance having a particular relationship to the length of the contiguous first and second portions, a bistable member having first and second states of operation, first receiving means in each pair being associated with the bistable member in its first state of operation, the other receiving means in each pair being associated with the bistable member in its second state of operation, electrical circuitry for sequentially selecting particular receiving means in successive rows in accordance with the state of operation of the bistable member, and means for triggering the bistable member into a particular one of its two states of operation in accordance with the contiguous disposition of the selected receiving means relative to the associated first and second portions.

11. An analogue-to-digital converter, including, means for providing an analogue representation of an information value, means for converting the analogue representation into control signals having digital significances geometrically related to one another and having positive and negative polarities, a plurality of receiving means associated with the different control signal means to produce output signals in accordance with the polarities of the control signals, means for sequentially activating the receiving means associated with successive control signal means in the geometric progression, means for producing output signals in accordance with the signals from particular receiving means selected from the activated receiving means, such receiving means being operative upon the control signals having particular digital significances, and electrical circuitry including a plurality of "and" networks and "or" networks for sequentially selecting particular receiving means from the activated receiving means and for making such selection in accordance with the signals representing the output from the preceding control signals in the geometric progression.

12. An analogue-to-digital converter, including, means for providing an analogue representation of an information value, means for converting the analogue representation into pairs of signals having digital significances geometrically related to one another, a plurality of receiving means responsive to the different pairs of converting means to produce signals in accordance with the relative phase of the signals in the associated pairs, means for sequentially activating successive pairs of receiving means for the selection of a particular one of the receiving means in the activated pair, an output stage for producing signals in accordance with the signals from the receiving means selected in the activated pair, and means controlled by the output stage to select the particular receiving means in each activated pair in accordance with the signals produced by the output stage for the preceding pair during the activation of the preceding pair.

13. An analogue-to-digital converter, including, means for providing an analogue representation of an information value, means for converting the analogue representation into pairs of control signals, each pair of control signals having digital significances related to one another in a geometric progression, each of the control signals having positive and negative polarities, a plurality of paired receiving means, each pair of receiving means being electrically associated with the control signals in a different pair, a bistable member having first and second states of operation, electrical circuitry for preparing successive pairs of receiving means for activation at spaced intervals of time, electrical circuitry for determining the particular receiving means to be activated in the pair prepared for activation in accordance with the operation of the bistable member in one of its two states, and electrical circuitry for triggering the bistable member into a particular one of its two states in accordance with the signal produced on the activated receiving means to control the activation of the particular receiving means in the next pair.

14. An analogue-to-digital converter, including, means for providing an analogue representation of an information value, means for converting the analogue representation into control signals having digital significances related to one another in a geometric progression, each of the control signals having positive and negative polarities, a plurality of receiving means associated electrically with the difference control signals to produce output signals in accordance with the polarities of the associated control signals, a bistable member having first and second states of operation, and a plurality of electrical networks associated with the bistable member and the different receiving means to render sequentially active the receiving means associated with successive control signals in the geometric progression for the triggering of the bistable member into one of its two states of operation in accordance with the polarity of the control signals electrically associated with the active receiving means.

15. An analogue-to-digital converter, including, means for providing an analogue representation of an information value, means for converting the analogue representation into pairs of control signals, each pair of control signals having rates of recurrence related to one another in a geometric progression, each of the control signals having positive and negative polarities, a plurality of receiving means each associated electrically with the control signals for the production of first output signals upon an electrical association with control signals having negative polarities and for the production of second output signals upon an electrical association with control signals having positive polarities, a bistable member having first and second states of operation in accordance with the production of the first and second signals in the receiving means, counting means for activating the receiving means in sequence to sequentially activate successive pairs of control signal means for the production of output signals, means including the bistable member for selecting a particular one of the activated receiving means in accordance with the state of operation of the bistable member, and means including the bistable member and the selecting means for triggering the bistable member into a particular one of its two states of operation in accordance with the electrical association between the selected one of the activated receiving means and the associated control signal means.

16. An analogue-to-digital converter, including, means for providing an analogue representation of an information value, means for converting the analogue representation into pairs of control signals, each pair of control signals having rates of recurrence related to one another in a geometric progression, each of the control signals having positive and negative polarities, a plurality of paired receiving means, the receiving means in each pair being electrically disposed to produce signals in accordance with the polarities of the control signals in a different pair, a bistable member having first and second states of operation, means for providing a plurality of intermittent signals, means having a plurality of output terminals for providing a count of the intermittent signals, means including a plurality of logical "and" electrical networks each connected to receive signals from the bistable member, from different receiving means and from a different output terminal in the counting means to provide an output signal in accordance with the signals introduced to it and upon the selection of the "and" network for activation as a result of the simultaneous introduction of the different signals, and means for triggering the bistable member to one of its two states of operation in accordance with the output signals from the "and" networks selected for activation.

17. An analogue-to-digital converter, including, a member having information disposed in rows on the member, the information being disposed in geometrically progressive significance for the successive rows, a plurality of receiving means associated with the different rows to produce signals in accordance with the disposition of the receiving means relative to the information in the rows, means including a plurality of "and" networks and a plurality of "or" networks for successively activating the receiving means associated with successive rows in the plurality, means for producing output signals in accordance with the signals from particular receiving means selected in successive rows upon the activation of the receiving means, and means including a plurality of "and" networks and a plurality of "or" networks for sequentially selecting the particular receiving means in each row upon the activation of the receiving means in the row and in accordance with the signals representing the output from the preceding row.

18. An analog-to-digital converter, including a member having information disposed in rows on the member, a plurality of receiving means associated with the different rows to produce signals in accordance with the disposition of the receiving means relative to the information in the rows, means coupled to the receiving means for producing output signals in accordance with the signals from particular receiving means selected in successive rows upon the activation of the receiving means in the rows, and electrical circuitry including a plurality of "and" networks and "or" networks coupled to the receiving means and to the last mentioned means for sequentially selecting the particular receiving means in each row upon the activation of the receiving means in the row and in accordance with the signals representing the output from the previous row, each of the "and" networks including at least a pair of unidirectional members for passing a signal controlling selection of the receiving means upon the simultaneous introduction of signals to all of the unidirectional members and each of the "or" networks including at least a pair of unidirectional members passing a signal controlling selection of the receiving means upon the introduction of signals to at least one of the unidirectional members in the "or" network.

19. An analog-to-digital converter, including an information member having first, second and third rows of first and second segments, the first and second segments in each row having an alternate disposition and equal lengths and having lengths geometrically related to the lengths of the segments in the other two rows, a least a first receiving means disposed in coupled relationship to the first and second segments in the first row for producing first output signals upon a coupling with the first segments in the rows and for producing second output signals upon a coupling with the second segments in the rows, a first pair of receiving means disposed in coupled relationship to the segments in the second row and separated from each other by a distance related to the lengths of the segments in the row, a second pair of receiving means disposed in coupled relationship to the segments in the third row and separated from each other by a distance related to the lengths of the segments in the row, means including first electrical circuitry coupled to the receiving means in the first pair for selecting a particular one of the receiving means in the first pair in accordance with the production of the first or second signals by the first receiving means and for obtaining the production of the first or second output signals in accordance with the disposition of the selected receiving means relative to the first and second segments in the associated row, and means including second electrical circuitry coupled to the receiving means in the second pair for selecting a particular one of the receiving means in the second pair in accordance with the production of the first or second signals by the selected receiving means in the first pair and for obtaining the production of the first or second output signals in accordance with the disposition of the selected receiving means in the second pair relative to the first and second segments in the associated row.

20. An analog-to-digital converter, including means for providing an analog representation of an information value, means responsive to the analog representation for converting the analog representation into at least a first signal and into a first pair of control signals and into a second pair of control signals having frequencies geometrically related to one another to represent digital information with digital significances geometrically related to the frequencies of the signals and for producing the control signals in each of the first and second pairs with a particular phase relationship to each other, means including electrical circuitry responsive to the polarity of the first control signal to select a particular one of the control signals in the first pair and to produce an output signal in accordance with the polarity of the selected control signal in the first pair, and means including electrical circuitry responsive to the particular control signal selected in the first pair and to the polarity of the selected control signal in the first pair to select a particular one of the control signals in the second pair and to produce an output signal in accordance with the polarity of the selected control signal in the second pair.

21. An analogue-to-digital converter, including an information member having a plurality of first and second portions arranged in rows, the first and second portion of each row being disposed in alternate relationship, a plurality of brushes coupled to the different rows for the production of signals in accordance with the disposition of the brushes relative to the first and second portions in the coupled rows, the brushes being paired and the brushes in each pair having a displacement with respect to the relative disposition between the brushes and the first and second portions coupled to the brushes, this relative displacement being dependent upon the lengths of the segments disposed in coupled relationship to the brushes, means for producing a plurality of clock signals, counting means coupled to the clock signal means and to the pairs of brushes for sequentially activating different pairs of brushes in the plurality for the selection of a particular one of the brushes in each activated pair, output means coupled to the brush selected from each activated pair for producing an output signal in accordance with the particular brush selected from the activated pair and in accordance with the disposition of the selected brush relative to the coupled first and second portions, and selecting means coupled to the brushes and to the output means for selecting a particular one of the brushes in each activated pair of accordance with the brush selected in the previously activated pair and in accordance with the output produced by the output means for the selected brush in the previously activated pair.

22. An analogue-to-digital converter, including an information member having a plurality of first and second portions disposed in alternate relationship, a plurality of brushes disposed in spaced relationship for a relative movement between the information member and the brushes and for a disposition of particular ones of the first and second portions in coupled relationship to the brushes in accordance with such relative movement, the brushes in the plurality being paired, first electrical circuitry coupled to the brushes for sequentially activating different pairs of brushes for the selection of a particular one of the brushes activated in each pair, a bistable member having first and second states of operation and coupled to the brushes in each pair for the production of the first or second states of operation in accordance with the particular brush selected in each pair and in accordance with the disposition of this brush relative to the first and second portions, and second electrical circuitry coupled to the first electrical circuitry, to the brushes and to the bistable member for selecting a particular one of the brushes in the activated pair in accordance with the operation of the bistable member in the first and second states.

23. An analog to digital converter comprising, an information member having a plurality of first and second portions arranged in rows, a plurality of receiving means each associated with said first and second portions of said member, a pair of said receiving means being associated with each row but one, which one has a single receiving means associated therewith, each of said receiving means being for producing signals according to its disposition relative to said first and second portions in its associated row, means responsive to the signal produced by said single receiving means for selecting one receiving means of that pair associated with the row of next higher ordinal significance, and means responsive to the signal produced by that receiving means selected by the signal on said single receiving means for selecting one receiving means of that pair associated with the row of next higher ordinal significance.

24. An analog to digital converter comprising a binary coded member having a plurality of rows with alternate first and second segments in each row and each successive row representing a more significant digit, at least one readout element positioned to read said segments in the least significant digit row, a pair of spaced readout elements positioned to read said segments in each of the other rows, said readout elements in each pair being spaced in such a manner that one readout element is approximately in the center of a segment when the other readout element is between segments, means for deriving an output from said least significant digit row when said first readout element is adjacent one of said segments, means for selecting one of said readout elements in any one of said more significant digit rows when the output from the immediately preceding row indicates a particular binary number and means for selecting the other readout element in any one of said more significant digit rows when the output from the immediately preceding row indicates the opposite binary number.

25. An analog to digital converter comprising a coded information member having a plurality of at least three rows with alternate segments in each row representing the digits (0) and (1) and each successive row representing a more significant digit in a binary system, at least one readout element positioned to read the segments in the least significant digit row, a leading and lagging readout element for each successive row positioned to read the segments in said row, means for deriving a digital (1) output from said least significant digit row only when said first readout element is adjacent a (1) segment, means for selecting a lagging readout element in any one of said more significant digit rows when the output from the immediately preceding row is a (1) and selecting a leading readout element in any one of said more significant digit rows when the output from the immediately preceding row is a (0), and means for deriving a digital (1) output from each of said rows only when said selected readout element is adjacent a (1) segment.

26. An analog to digital converter comprising a binary coded member having a plurality of rows with alternate first and second segments in each row and each successive row representing a more significant digit, at least one readout element positioned to read said segments in the least significant digit row, a pair of spaced readout elements positioned to read said segments in each of the other rows, said readout elements in each pair being spaced from each other by at least one half segment, means for deriving an output from said least significant digit row when said first readout element is adjacent one of said segments, means for selecting one of said readout elements in any one of said more significant digit rows when the output from the immediately preceding row indicates a particular binary number and means for selecting the other readout element in any one of said more significant digit rows when the output from the immediately preceding row indicates the opposite binary number.

27. An analog to digital converter comprising a binary coded member having a plurality of rows with alternate conductive and nonconductive segments in each row and each successive row representing a more significant digit, at least one electrical contact element positioned to contact said segments in the least significant digit row, a pair of spaced electrical contact elements positioned to contact said segments in each of the other rows, said contact elements in each pair being spaced in such a manner that one contact element is approximately in the center of a segment when the other contact element is between segments, means for deriving an output from said least significant digit row when said first contact element is contacting one of said segments, means for selecting one of said contact elements in any one of said more significant digit rows when the output from the immediately preceding row indicates a particular binary number and for selecting the other contact element in any one of said more significant digit rows when the output from the immediately preceding row indicates the opposite binary number.

28. An analog to digital converter comprising a binary coded member having a plurality of rows with alternate conductive and nonconductive segments in each row and each successive row representing a more significant digit, at least one electrical contact element positioned to contact said segments in the least significant digit row, a pair of spaced electrical contact elements positioned to contact said segments in each of the other rows, said contact elements in each pair being spaced from each other by at least one half segment, means for deriving an output from said least significant digit row when said first contact element is contacting one of said segments, means for selecting one of said contact elements in any one of said more significant digit rows when the output from the immediately preceding row indicates a particular binary number and means for selecting the other contact element in any one of said more significant digit rows when the output from the immediately preceding row indicates the opposite binary number, and means for providing an output from the selected contact element in each of said more significant digit rows.

References Cited in the file of this patent

UNITED STATES PATENTS

| | | |
|---|---|---|
| 2,207,743 | Larson | July 16, 1940 |
| 2,504,999 | McWhirter | Apr. 25, 1950 |
| 2,666,912 | Gow | Jan. 19, 1954 |
| 2,685,054 | Brenner | July 27, 1954 |
| 2,679,644 | Lippel et al. | May 25, 1954 |
| 2,747,797 | Beaumont | May 29, 1956 |
| 2,750,584 | Goldfischer | June 12, 1956 |

FOREIGN PATENTS

| | | |
|---|---|---|
| 650,913 | Great Britain | Mar. 7, 1951 |

OTHER REFERENCES

Publ., Radio Amateurs Handbook, 1945, pages 138–139.